(12) United States Patent
Douglas

(10) Patent No.: US 6,751,691 B1
(45) Date of Patent: Jun. 15, 2004

(54) ARRANGEMENT FOR DATA TRANSFER BETWEEN A COMPUTER AND PERIPHERAL DEVICE OR OTHER DATA PROCESSING DEVICE

(75) Inventor: Terence A. Douglas, Banstead (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/427,820

(22) Filed: Oct. 27, 1999

(30) Foreign Application Priority Data

Oct. 27, 1998 (GB) .............................. 9823356

(51) Int. Cl.[7] .......................... G06F 13/00; G11C 7/00; G06K 11/12
(52) U.S. Cl. ........................ 710/73; 710/12; 710/62; 307/104; 345/163
(58) Field of Search ......................... 710/12, 62, 73; 307/104; 345/163

(56) References Cited

U.S. PATENT DOCUMENTS

| 4,564,835 A | * | 1/1986 | Dhawan .................... 345/163 |
| 4,763,340 A | * | 8/1988 | Yoneda et al. .............. 375/377 |
| 4,798,322 A | * | 1/1989 | Bernstein et al. ........... 235/380 |
| 5,365,461 A | * | 11/1994 | Stein et al. ............. 178/18.01 |
| 5,451,763 A | * | 9/1995 | Pickett et al. ............. 235/451 |
| 5,455,466 A | * | 10/1995 | Parks et al. ................ 307/104 |
| 5,657,012 A | * | 8/1997 | Tait .......................... 341/20 |
| 5,681,220 A | * | 10/1997 | Bertram et al. .............. 463/37 |
| 5,828,365 A | * | 10/1998 | Chen .......................... 345/163 |
| 5,831,597 A | * | 11/1998 | West et al. .................. 345/156 |
| 5,936,841 A | * | 8/1999 | Kantner et al. ............. 361/737 |
| 6,219,225 B1 | * | 4/2001 | Tsuzura et al. .............. 361/612 |
| 6,414,671 B1 | * | 7/2002 | Gillespie et al. ............ 345/157 |

FOREIGN PATENT DOCUMENTS

| EP | 0676710 A1 | 4/1995 | ............ G06K/7/08 |
| EP | 0676710 A1 | 10/1995 | |
| EP | 0744750 A2 | 11/1996 | ............ G11C/7/00 |
| EP | 0775967 A1 | * 5/1997 | |
| GB | 2273163 A | * 6/1994 | ........... G06K/11/12 |
| WO | WO9801905 | 1/1998 | ........... H01L/23/02 |

OTHER PUBLICATIONS

IBM–Technical Disclosure Bulletin, Dec. 1, 1991, vol. 34, Issue 7A, pp. 224–226.*

* cited by examiner

*Primary Examiner*—Jeffrey Gaffin
*Assistant Examiner*—Tammara Peyton

(57) ABSTRACT

An arrangement for data transfer between a desk top personal computer (1) and a peripheral or other data processing device (7) comprises a transfer pad (5) which comprises two conductive plates (8, 9) which is connected to the personal computer (1) via a lead (6). The peripheral or other data processing device (7) has a transfer pad (11) which comprises two conductive pads (12, 13) attached to or forming part of the lower wall of its housing. For data transfer to occur the two transfer pads are brought into close proximity so that they provide a capacitative coupling between the personal computer (1) and the peripheral or other data processing device (7).

20 Claims, 3 Drawing Sheets

ARRANGEMENT FOR DATA TRANSFER BETWEEN A COMPUTER AND PERIPHERAL DEVICE OR OTHER DATA PROCESSING DEVICE

BACKGROUND OF THE INVENTION

The invention relates to an arrangement for transferring data between a desk top computer and a peripheral device or other data processing device, particularly, but not exclusively, portable data processing devices such as personal digital assistants and lap top computers. The invention further relates to a computer mouse mat which includes data transfer means.

There are an increasing number of portable and peripheral devices that provide a need for data transfer between them and a desk top computer. Such devices include lap top computers, personal digital assistants (PDA) communications equipment containing modems for accessing databases etc. While these devices are designed to be used mainly in a stand-alone mode for use when the user is away from a permanent location, they often need to be connected to a fixed computer system at the user's base. For example the user may wish to download data or files from a lap top computer or PDA on to the fixed computer system.

Such a requirement gives rise to the need for simple and reliable data transfer between the devices, preferably at high speed. A number of possibilities have been proposed and implemented but they all have specific limitations. Plug and socket arrangements require standardisation between the various components which is largely been achieved. They also, however, suffer some reliability problems. The projections in the male section of a typical data connector are subject to damage by contamination, by misaligned insertions and by physical impacts (for example when dropped). The female section may also be damaged by contamination (which can be alleviated by appropriate hinged covers but at extra cost) and by misaligned insertions.

An alternative approach is wireless transfer using either radio waves or infra-red radiation. The former has regulatory restrictions which vary from country to country and which may cause problems for travellers and the latter requires line of sight between the infra red transmitter and receiver. In both cases a relatively expensive transmitter and receiver is required and the transmitter will also consume significant power, which is particular disadvantage for battery powered equipment. Simple infra-red data links also tend to have a limited speed of data transfer.

EP-A-0676710 discloses portable computing and communications devices which are connected with other typically fixed devices via the use of a capacitative data connector. Each of the two mating sections of the connector include a set of coupling plates. When the two sections are brought into contact the coupling plates form capacitors across which data signals can be passed. Circuitry driving each section of the data connector is such as to create a bi-directional signalling path, thereby providing a connection, which is functionally equivalent to an ohmic connection. Signals that are typically passed across data connectors on individual parallel leads are in the disclosed data connector serialised, passed across the connector in that form and connected back to parallel form on the other side of the connection. Each section of the connector illustratively includes a permanent magnet to draw and hold the two sections in alignment, thereby providing a connector, which is self aligning.

The connector disclosed in EP-A-0676710 overcomes some of the disadvantages disclosed above in that physical contact between the coupling plates is not made, there is a gap left to form a dielectric of the capacitor. The connector disclosed in this patent application does, however, suffer from some disadvantages in that it is a relatively expensive construction and it is necessary to accurately locate the two parts of the connector together.

SUMMARY OF THE INVENTION

It is an object of the invention to enable the transfer of data between a desk top computer and a peripheral device or other data processing device which mitigates at least some of the disadvantages of the prior art arrangement set out above.

The invention provides an arrangement for transferring data between a computer and peripheral device or other data processing device, the arrangement comprising a first pair of conductive plates connected to said computer and a second pair of conductive plates, said second pair being carried on or formed as part of a wall of the housing of said peripheral device or other data processing device, means for bringing the first and second conductive plates into close proximity so as to form a pair of capacitors: wherein for transmitting data from the computer to the peripheral device or other data processing device the computer includes means for applying the data to be transferred in the form of a differential pulse voltage to the first pair of conductive plates and the peripheral device or other data processing device includes means for detecting the differential voltage impressed on the second pair of conductive plates by that applied to the first pair of conductive plates and converting the detected differential voltage to appropriate data pulses for use by and/or storage in the peripheral device or other data processing device, and/or wherein for transmitting data from the peripheral device or other data processing device to the computer the peripheral device or other data processing device includes means for applying the data to be transferred in the form of a differential pulse voltage to the second pair of conductive plates and the computer includes means for detecting the differential voltage impressed on the first pair of conductive plates by that applied to the second pair of conductive plates and converting the detected differential voltage to the appropriate data pulses for use by and/or storage in the computer.

By this means a simple low cost data transfer between a computer and portable data processing devices can be achieved. The alignment between the first and second pairs of plates does not have to be exact and a simple placing of the second pair in proximity to the first is sufficient. The power consumption associated with infra red or radio transmitters is avoided and no costly plug and socket connectors are required.

In a first embodiment the first pair of conductive plates may be external to the computer and connected to the housing of the computer by a twisted pair of conductors or by a screened pair of conductors. In this case the first pair of conductive plates are, in effect, on a flying lead and the peripheral device or other data processing device may be placed directly on top of the first pairs of plates so that the second pair of plates is brought into proximity with the first. Alternatively, of course the first pair of plates could be placed on top of the peripheral device or other data processing device.

In a second embodiment the first pair of conductive plates is carried on or formed as part of a wall of the housing of the computer. This eliminates the potentially vulnerable flying leads but requires at least a portion of one surface, normally a horizontal upper surface, to be left uncovered to accommodate the peripheral device or other data processing device when data transfer is required. Thus it may not be possible to place a monitor on top of the computer housing if this arrangement is adopted. This has the potential disadvantage of requiring a larger desk space to accommodate the computer.

As a further optional refinement of the second embodiment the first pair of conductive plates may be surrounded by an electromagnetic shield. This reduces any problems of electromagnetic interference, which may arise during data transfer. It is also possible to use the electromagnetic shield as a means of locating the peripheral device or other data processing device with its (second) pair of conductive plates in proximity to the (first) pair of conductive plates formed on the computer.

The peripheral devices or other data processing devices may take many forms. Examples are lap top computers, personal digital assistants, modems, printers, scanners etc.

The pair of conductive plates in the peripheral device of other data processing device may be formed in many ways. Inexpensive constructions are metal foils attached by adhesives to the inside of a wall of the housing containing the device or a conductive paint sprayed on the inside of the wall of the housing.

The invention further relates to a mouse mat having formed therein two conductive plates covered by an insulating layer on which a mouse may be manoeuvred and comprising means for coupling the two conductive plates to a data transfer port of a computer.

This has the advantage that the transfer pad attached to the computer is formed in an article which is normally associated with a desk top computer and will normally be present on a desk adjacent to the computer. In addition a mouse mat will usually be kept clear of any equipment or papers to enable a mouse to be used. Consequently, for data transfer, it is merely necessary to move the mouse and replace it on the mat by the portable device.

The mouse mat may carry a printed indicator of the centre line between the two conductive plates. This enables the portable equipment to be located easily into a position where its conductive plates are aligned with those in the mouse mat, and is particularly useful where the portable equipment is very different in size from the mat.

The coupling means may comprise a pair of conductors, each pair having one end connected to a respective one of the plates and the other end connected to one part of a plug and socket arrangement. The other part of which is mounted on the computer.

This gives an arrangement of a mouse mat with a flying lead for coupling to the computer in a manner similar to that by which a mouse is coupled to the computer. An alternative arrangement would be to have fixed pins on the perimeter of the mouse mat to which a connector was coupled.

The above and other features and advantages of the invention will become apparent from the following description, by way of example, of embodiments of the invention with reference to the accompanying drawings,

DETAILED DESCRIPTION OF THE PREFERRED EMBODIMENTS

Figure 1:
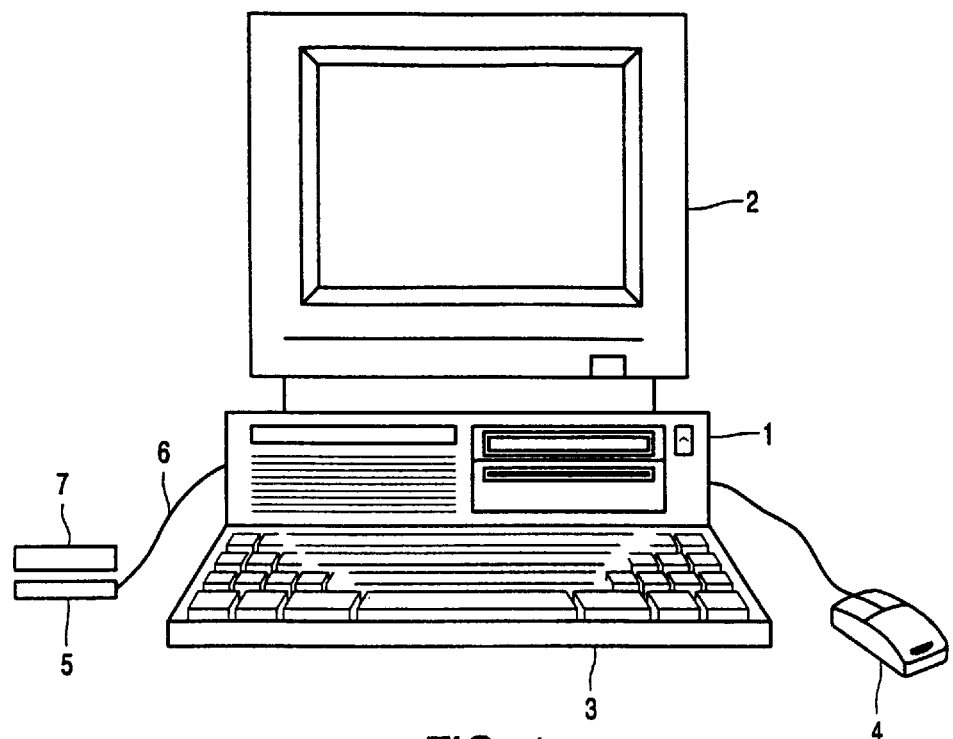
FIG. 1 shows in schematic form a personal digital assistant connected to a computer for data transmission between them according to the invention.
Figure 2:
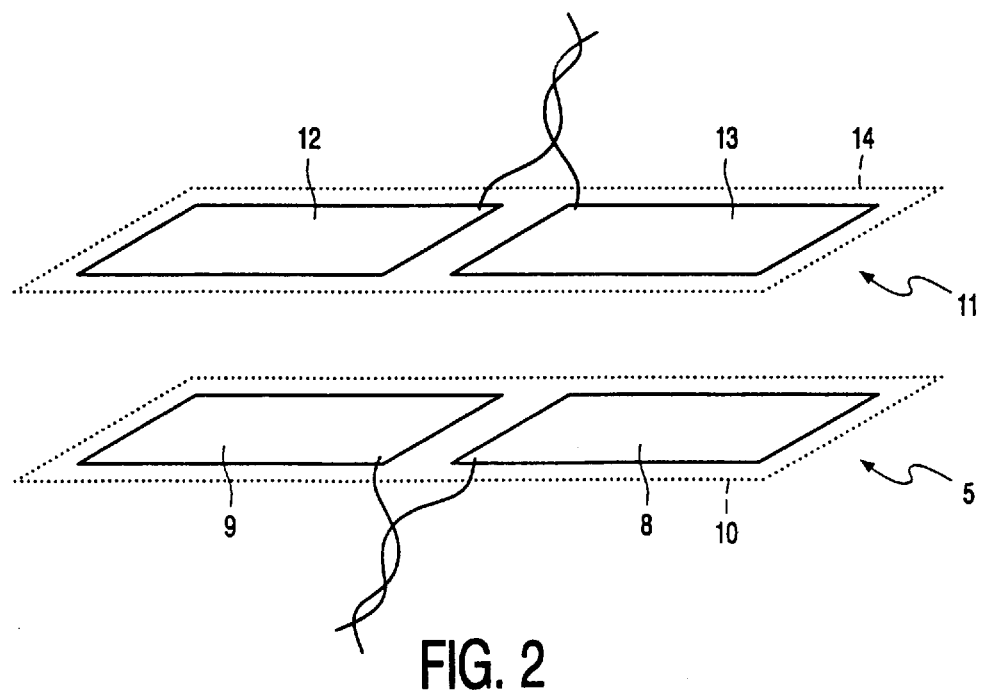
FIG. 2 illustrates the transfer plates for connection to a computer and to a peripheral or other data processing device.

FIGS. 1 and 2 illustrate diagrammatically the transfer of data between a desk top computer and a peripheral or other data processing device. As shown in FIG. 1, a desk top computer comprises a computer box 1, a monitor 2, a keyboard 3, a mouse 4, and a transfer pad 5, which is connected to the computer box 1 via a twisted pair of conductors 6. A peripheral device 7, which will generally be a portable device such as a PDA or a lap top computer is placed on top of the transfer pad 5. As shown in FIG. 2 the transfer pad 5 comprises two conductive areas 8 and 9 which are formed on an insulating layer 10. A similar transfer pad 11 has conductive areas 12 and 13 which are mounted on an insulating substrate 14. The transfer pad 5 is connected by means of a twisted pair connection to the computer 1, while the transfer pad 11 is connected via a twisted pair connection to the PDA or other data processing device 7. The transfer pad 11 is formed as part of the housing of the PDA 7. There are many forms this construction could take, but for example, two metal foils could be fixed by adhesive to the inside of the lower wall of the casing of the PDA 7, or conductive paint could be sprayed on selected areas of the inside of the lower wall of the housing of the PDA 7. Thus the twisted pair connection between the transfer pad 11 and the circuitry of the PDA will be totally within the housing of the PDA 7.

One convenient construction for the transfer pad 5 is to form it as part of a mouse mat. Thus, the two conductive plates 8 and 9 can be formed by metal foil which is then protected by a working surface on which a mouse is manoeuvred and when data transfer is to take place the mouse is removed from the mouse mat and replaced by the PDA. This has the advantage that the transfer pad 5 does not take any additional desk space in a normal desk top computer environment. Conveniently the mouse mat may be provided with a flying lead having a plug and socket connection to the computer in a similar manner to the connection of a mouse to a computer. It would, of course, be equally possible to locate the plug and socket connection on the mouse mat rather than or in addition to on the computer. Further, to enable easy location of the portable device with respect to the conductive plates the top surface of the mouse mat could be provided with a printed centre line or the location of the plates could be indicated by different colours on the surface of the mat.

Figure 5:
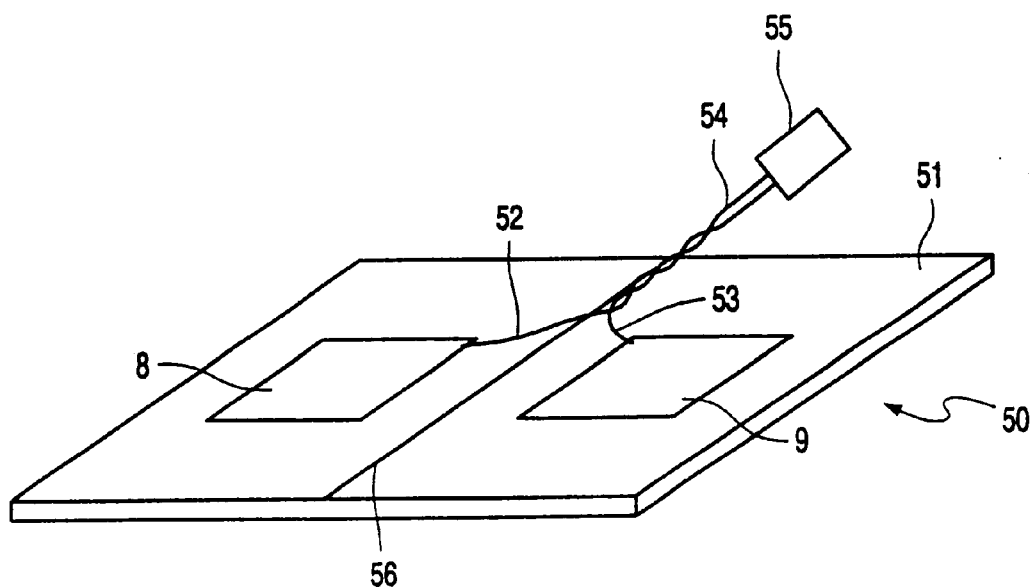
FIG. 5 shows a mouse mat according to the invention.

FIG. 5 shows an embodiment of a mouse mat in accordance with the invention. The mouse mat 50 has an upper surface 51 under which two conductive plates 8 and 9 are located. The upper surface 51 preferably covers the conductive plates 8 and 9 giving them protection from abrasion and preventing any conductive material which may be placed on the mouse mat from shorting them together. The plates 8 and 9 are connected to respective conductors 52 and 53 in a cable 54 which is provided on its remote end with a plug 55 for connection to the computer in a similar manner to that in which a mouse is connected to the computer. As an alternative the plates 8 and 9 may be connected to respective pins on one edge of the mouse mat to which a cable from the computer may be attached. The upper surface 51 of the mouse mat may be provided with a printed centre line 56 to guide the placing of the portable device with respect to the conductive plates. An alternative arrangement would be to provide coloured patches above the conductive plates 8 and 9. Various other schemes for identifying the location of the conductive plates 8 and 9 could be used, for example different textures of material.

The dimensions of the transfer pads are not critical but may for example be taken to fit conveniently within the smallest data processing device which is likely to be connected to the computer. A typical overall size might be 12 cms by 6 cms. This would allow for two conductive areas 5 cm×5 cm separated by a gap of 1 cm and with a ½ cm border around the two conductive areas. This is likely to fit conveniently within present PDAs. In an embodiment where the transfer pad 5 forms part of a mouse mat it would be convenient to print on the top of the mouse mat a centre line about which the conductive pads are arranged, so that an indication as to the position in which the portable data processing device should be placed can be given. It is not necessary for the two transfer pads to be exactly aligned and good data transfer will take place with a misalignment of 2 cm in the case where there is a 1 cm gap between the conductive plates. Additionally it is not necessary for the transfer pads to have the same dimensions although it may be convenient to standardise on a particular size which, as suggested above, may be chosen to fit conveniently within the body of the smallest device which is likely to transfer data to or receive data from the computer.

Figure 3:
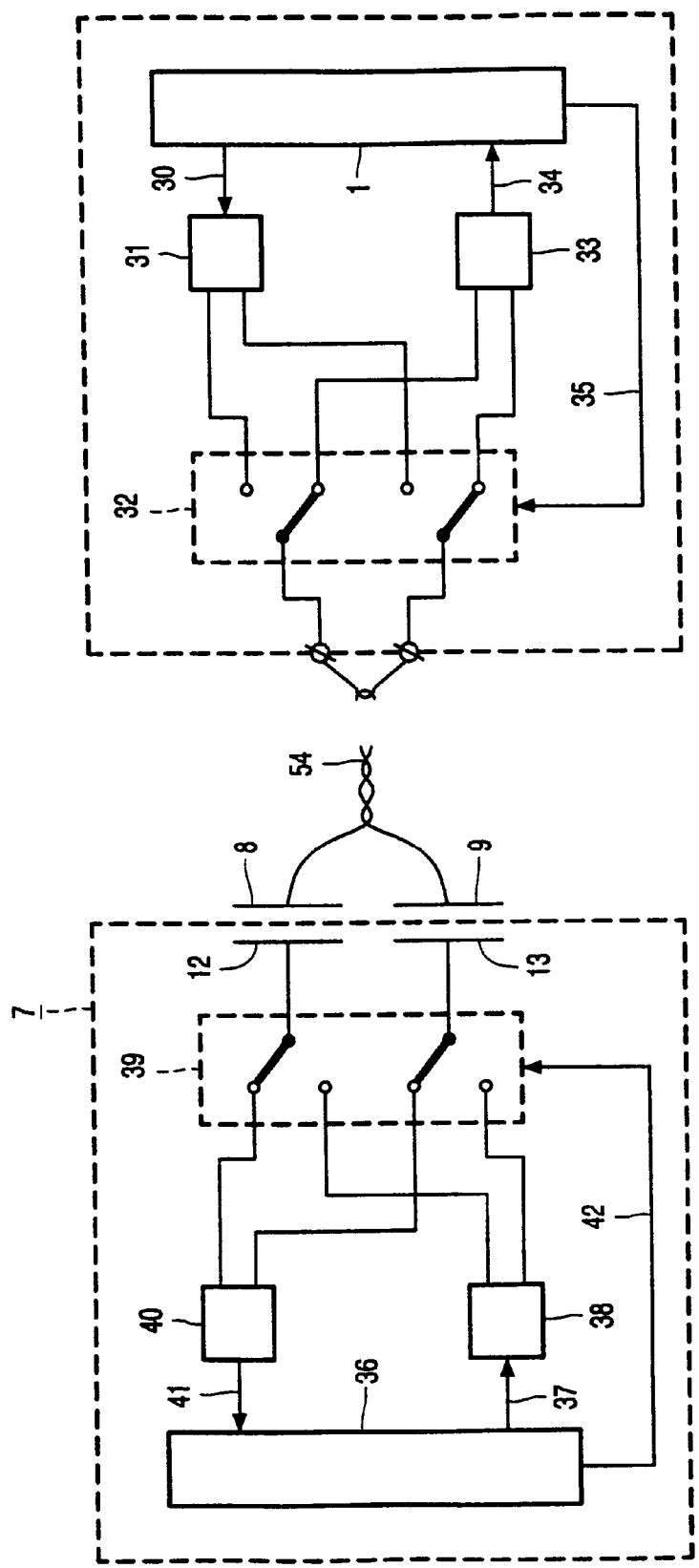
FIG. 3 is a block schematic diagram of the transmit/receive arrangement for passing data between the computer and peripheral or other data processing device.

FIG. 3 shows in block schematic form the electrical interface between the fixed computer 1 and the portable device 7. As shown in FIG. 3 the computer 1 is connected via a serial output 30 to a transmitter 31. The transmitter 31 takes the serial data from the computer 1 and converts it to a differential voltage for application to the plates 8 and 9 of the transfer pad 5 via the twisted pair connection 6. The connection to the twisted pair is via a switching arrangement 32, which in FIG. 3 is shown switched to connect the transmitter 31 to the conductive plates 8 and 9. The transmitter 31 converts the serial data from the computer 1 into a differential pulse voltage for application to the conductive plates 8 and 9. The switching arrangement 32 further connects the plates 8 and 9 to the input of a receiver 33, which receives a differential voltage which has been impressed on the plates 8 and 9 and converts it into data pulses for application to the computer 1 via the line 34. The computer 1 has a control output which is fed via a line 35 to control input of the switching arrangement 32 so that when the computer wishes to transmit data to the portable device the outputs of the transmitter 31 are connected to the plates 8 and 9 while when the computer wished to receive data from the portable device 7 the voltage impressed on plates 8 and 9 is fed to the input of the receiver 33.

The interface to the portable equipment 7 is similar to that to the desk top computer 1. The data processing part 36 of the portable equipment 7 has an output which is fed via a line 37 to a transmitter 38 whose outputs are connected via a switching arrangement 39 to the conductive plates 12 and 13. Similarly the conductive plates 12 and 13 are connected to inputs of a receiver 40 via the switching arrangement 39 and the output of the receiver 40 is fed via a line 41 to the data processing 36 of the portable equipment. A further output of the data processing portion 36 is fed via a line 42 to control inputs of the switching arrangements 39. Thus when the portable device wishes to transmit data to the fixed computer 1 the switching arrangement is operated to connect the outputs of the transmitter 38 to the conductive plates 12 and 13 while when the portable device is arranged to receive data from the computer 1 the switching arrangement is 39 is arranged to connect the plates 12 and 13 to the input of the receiver 40.

The transmitters 31 and 38 may take essentially the same form and are arranged to convert input data to a differential output voltage. Similarly receivers 33 and 40 take the differential voltages, which are impressed on the plates by the transmitter of the other device, convert these differential voltages into a data pulse of a particular format for the data processing sections. The reason for transmitting the data as differential voltages is so that electromagnetic fields produced will substantially cancel and the radiated fields will be minimised to reduce interference with other equipment caused by the data transfer.

The transmitter 31, receiver 33 and switching arrangement 32 may be formed from an applications specific integrated circuit (ASIC) which can be carried by a plug in card to fit within the computer 1. The computer 1 is then provided with two pins to which an appropriate cable can be connected between the computer and the transfer plates. Thus the transfer plate 5 may be a plug in device which plugs into an external socket on the computer in a similar manner to that in which a mouse is connected to the computer.

Figure 4:
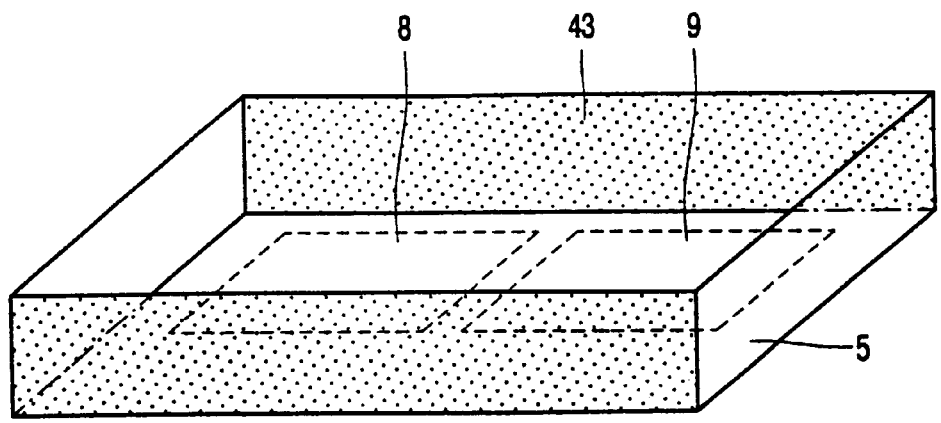
FIG. 4 shows an arrangement in which the data transfer plate attached to the computer is contained within an electromagnetic shield.

For the desk top computer R.F. screening can be included as part of the transfer pad 5 to minimise electromagnetic radiation if required. The two signal connections from the computer to the transfer pad 5 may consist of a twisted pair, or a screened pair and the coupling plates may be mounted inside an open top screening box having a ground potential back to the computer. Such a box is illustrated in FIG. 4. The transfer plate 5 forms the bottom of a tray shaped screen box having walls 43 which surround the transfer plate 5. The sides of the tray 43 are constructed of conductive material for example aluminium and are electrically connected to the ground potential of the computer. The tray will also provide a mechanical location of the portable device between which the data is being transferred. The screening box must be large enough to allow sufficient separation between the metallic sides of the box and the coupling plates mounted inside to minimise capacitance between them, this is especially true if the coupling plates will be used for two way data transfer.

The arrangement for transferring data described herein can be implemented at low cost, for example the conductive plates could be produced by aluminium foil glued to the inside surface of the plastic housing of the portable device or a conductive paint may be sprayed on to the plastic housing of the portable device. Alternatively, a low grade copper clad board could be used. As a further refinement, if the sizes of the transfer pads were standardised, mechanical location arrangements could be used to ensure accurate alignment of the two transfer pads thus ridges could be provided on the transfer pad connected to the desk top computer and appropriate grooves in the housing of the portable device provided. Of course the ridges and grooves could be reversed. This is of particular use where portable devices of differing dimensions have to be coupled to the computer where it may be more difficult to properly align the two transfer pads.

From reading the present disclosure, other modifications will be apparent to persons skilled in the art. Such modifications may involve other features which are already known in the design and use of electrical or electronic circuits for data transfer and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. An arrangement for transferring data between a computer and peripheral device or other data processing device, the arrangement comprising a first pair of conductive plates connected to said computer and a second pair of conductive plates, said second pair being carried on or formed as part of a wall of the housing of said peripheral device or other data processing device, and means for bringing the first and second conductive plates into close proximity so as to form a pair of capacitors: wherein for transmitting data from the computer to the peripheral device or other data processing device the computer includes means for applying the data to be transferred in the form of a differential pulse voltage to the first pair of conductive plates and the peripheral device or other data processing device includes means for detecting the differential voltage impressed on the second pair of conductive plates by that applied to the first pair of conductive plates and converting the detected differential voltage to appropriate data pulses for use by and/or storage in the peripheral device or other data processing device, and/or wherein for transferring data from the peripheral device or other data processing device to the computer the peripheral device or other data processing device includes means for applying the data to be transferred in the form of a differential pulse voltage to the second pair of conductive plates and the computer includes means for detecting the differential voltage impressed on the first pair of conductive plates by that applied to the second pair of conductive plates and converting the detected differential voltage to the appropriate data pulses for use by and/or storage in the computer, wherein the first pair of conductive plates is carried on or formed as part of a wall of the housing of the computer.

2. An arrangement for transferring data between a computer and peripheral device or other data processing device, the arrangement comprising a first pair of conductive plates connected to said computer and a second pair of conductive plates, said second pair being carried on or formed as part of a wall of the housing of said peripheral device or other data processing device, and means for bringing the first and second conductive plates into close proximity so as to form a pair of capacitors: wherein for transmitting data from the computer to the peripheral device or other data processing device the computer includes means for applying the data to be transferred in the form of a differential pulse voltage to the first pair of conductive plates and the peripheral device or other data processing device includes means for detecting the differential voltage impressed on the second pair of conductive plates by that applied to the first pair of conductive plates and converting the detected differential voltage to appropriate data pulses for use by and/or storage in the peripheral device or other data processing device, and/or wherein for transferring data from the peripheral device or other data processing device to the computer the peripheral device or other data processing device includes means for applying the data to be transferred in the form of a differential pulse voltage to the second pair of conductive plates and the computer includes means for detecting the differential voltage impressed on the first pair of conductive plates by that applied to the second pair of conductive plates and converting the detected differential voltage to the appropriate data pulses for use by and/or storage in the computer, wherein the first pair of conducting plates is external to the computer and is connected to the housing of the computer by a twisted pair of conductors, or by a screened pair of conductors.

3. An arrangement as claimed in claim 1 in which the first pair of conductive plates is surrounded by an electromagnetic shield.

4. An arrangement as claimed in claim 3 in which the electromagnetic shield serves also to locate the second pair of conductive plates.

5. An arrangement as claimed in claim 1 in which the other data processing device is a lap top computer.

6. An arrangement as claimed in claim 1 in which the other data processing device is a personal digital assistant (PDA).

7. An arrangement as claimed in claim 1 in which the second pair of conducting plates is formed by a coating of conductive paint on the inside of one wall of the housing of the peripheral device or other data processing device.

8. An arrangement as claimed in claim 1 in which the computer is a desktop personal computer.

9. An arrangement for transferring data between a computer and peripheral device or other data processing device, the arrangement comprising a first pair of conductive plates connected to said computer and a second pair of conductive plates, said second pair being carried on or formed as part of a wall of the housing of said peripheral device or other data processing device, and means for bringing the first and second conductive plates into close proximity so as to form a pair of capacitors: wherein for transmitting data from the computer to the peripheral device or other data processing device the computer includes means for applying the data to be transferred in the form of a differential pulse voltage to the first pair of conductive plates and the peripheral device or other data processing device includes means for detecting the differential voltage impressed on the second pair of conductive plates by that applied to the first pair of conductive plates and converting the detected differential voltage to appropriate data pulses for use by and/or storage in the peripheral device or other data processing device, and/or wherein for transferring data from the peripheral device or other data processing device to the computer the peripheral device or other data processing device includes means for applying the data to be transferred in the form of a differential pulse voltage to the second pair of conductive plates and the computer includes means for detecting the differential voltage impressed on the first pair of conductive plates by that applied to the second pair of conductive plates and converting the detected differential voltage to the appropriate data pulses for use by and/or storage in the computer, wherein the first pair of plates are formed as part of a mouse mat.

10. An arrangement as claimed in claim 1 in which the computer is part of a network of computers.

11. A mouse mat having formed therein two conductive plates covered by an insulating layer on which a mouse may be maneuvered and comprising means for coupling the two conductive plates to a data receiving input of a computer.

12. A mouse mat as claimed in claim 11 carrying thereon a printed indication of a centre line between the two conductive plates.

13. A mouse mat as claimed in claim 11 in which the coupling means comprises a pair of conductors, each conductor having one end connected to a respective one of the plates and the other end connected to one part of a plug and socket arrangement, the other part of which is mounted on the computer.

14. A mouse mat as claimed in claim 11, further comprising two colored patches on a top surface of the mouse mat, each of said colored patches being located above a corresponding one of the conductive plates.

15. A mouse mat as claimed in claim 11, further comprising means for aligning a peripheral device placed on the mouse mat with the conductive plates.

16. The arrangement of claim 1, further comprising switching means for selectively connecting the first pair of conductive plates to the means for applying the data to be transferred in the form of a differential pulse voltage to the first pair of conductive plates, and to the means for detecting the differential voltage impressed on the first pair of conductive plates by that applied to the second pair of conductive plates.

17. The arrangement of claim 1, further comprising switching means for selectively connecting the second pair of conductive plates to the means for applying the data to be transferred in the form of a differential pulse voltage to the second pair of conductive plates, and to the means for detecting the differential voltage impressed on the second pair of conductive plates by that applied to the first pair of conductive plates.

18. The arrangement of claim 2, further comprising switching means for selectively connecting the first pair of conductive plates to the means for applying the data to be transferred in the form of a differential pulse voltage to the first pair of conductive plates, and to the means for detecting the differential voltage impressed on the first pair of conductive plates by that applied to the second pair of conductive plates.

19. The arrangement of claim 2, further comprising switching means for selectively connecting the second pair of conductive plates to the means for applying the data to be transferred in the form of a differential pulse voltage to the second pair of conductive plates, and to the means for detecting the differential voltage impressed on the second pair of conductive plates by that applied to the first pair of conductive plates.

20. The arrangement of claim 9, further comprising:
first switching means for selectively connecting the first pair of conductive plates to the means for applying the data to be transferred in the form of a differential pulse voltage to the first pair of conductive plates, and to the means for detecting the differential voltage impressed on the first pair of conductive plates by that applied to the second pair of conductive plates; and
second switching means for selectively connecting the second pair of conductive plates to the means for applying the data to be transferred in the form of a differential pulse voltage to the second pair of conductive plates, and to the means for detecting the differential voltage impressed on the second pair of conductive plates by that applied to the first pair of conductive plates.

* * * * *